(12) United States Patent
Sawicki et al.

(10) Patent No.: US 11,049,636 B2
(45) Date of Patent: Jun. 29, 2021

(54) TORQUE MOTOR WITH DOUBLE FIX SCREWS

(71) Applicant: Hamilton Sundstrand Corporation, Charlotte, NC (US)

(72) Inventors: Piotr Sawicki, Bogdaniec (PL); Piotr Kozlowski, Mielec (PL)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 165 days.

(21) Appl. No.: 16/140,954

(22) Filed: Sep. 25, 2018

(65) Prior Publication Data

US 2019/0237231 A1 Aug. 1, 2019

(30) Foreign Application Priority Data

Jan. 30, 2018 (EP) .................................... 18461511

(51) Int. Cl.
| | | |
|---|---|---|
| *H01F 7/00* | (2006.01) | |
| *H01F 7/122* | (2006.01) | |
| *F16K 31/06* | (2006.01) | |
| *F16K 27/02* | (2006.01) | |
| *F16K 31/08* | (2006.01) | |
| *H01F 7/14* | (2006.01) | |
| *H01F 7/127* | (2006.01) | |
| *H02K 26/00* | (2006.01) | |

(Continued)

(52) U.S. Cl.
CPC ............... *H01F 7/122* (2013.01); *F15B 9/09* (2013.01); *F15B 13/0438* (2013.01); *F16K 27/0263* (2013.01); *F16K 31/0627* (2013.01); *F16K 31/0679* (2013.01); *F16K 31/0682* (2013.01); *F16K 31/082* (2013.01); *H01F 7/021* (2013.01); *H01F 7/127* (2013.01); *H01F 7/14* (2013.01); *H01F 7/145* (2013.01); *H02K 26/00* (2013.01); *H02K 33/00* (2013.01); *H01F 2007/086* (2013.01)

(58) Field of Classification Search
CPC . H01F 7/122; H01F 7/14; H01F 7/021; H01F 7/145; F15B 13/043; F15B 9/09; H02K 33/00
USPC ......................................................... 335/229
See application file for complete search history.

(56) References Cited

U.S. PATENT DOCUMENTS 3,323,090 A 5/1967 O'Brien
5,679,989 A 10/1997 Buscher et al.
(Continued)

OTHER PUBLICATIONS

Extended European Search Report for International Application No. 18461511.0 dated Jul. 20, 2018, 6 pages.

*Primary Examiner* — Shawki S Ismail
*Assistant Examiner* — Lisa N Homza
(74) *Attorney, Agent, or Firm* — Cantor Colburn LLP

(57) ABSTRACT

A torque motor for use in a servovalve wherein only two holes must be provided through each of the pole pieces in order to assemble the torque motor together. The torque motor comprises first and second opposing pole pieces, first and second permanent magnets positioned between the first and second pole pieces; an armature comprising a magnetic plate and a flapper, the magnetic plate being positioned between the first and second permanent magnets, the flapper being connected at one end to the magnetic plate; and further comprising: first and second fastening means each extending through the first pole piece, the armature and the second pole piece to thereby fasten the torque motor together.

15 Claims, 11 Drawing Sheets

(51) Int. Cl.
*F15B 9/09* (2006.01)
*F15B 13/043* (2006.01)
*H01F 7/02* (2006.01)
*H02K 33/00* (2006.01)
*H01F 7/08* (2006.01)

(56) References Cited

U.S. PATENT DOCUMENTS

| | | | |
|---|---|---|---|
| 6,344,702 B1 | 2/2002 | Rodriguez et al. | |
| 2016/0049230 A1 | 2/2016 | Cichon | |
| 2018/0051821 A1* | 2/2018 | Kozlowski | F15B 13/0438 |
| 2018/0363684 A1* | 12/2018 | Kozlowski | F16K 31/0682 |
| 2019/0048900 A1* | 2/2019 | Kozlowski | F15B 13/0433 |
| 2019/0093725 A1* | 3/2019 | Cis | F15B 13/0438 |
| 2019/0118315 A1* | 4/2019 | Kozlowski | F16K 51/00 |
| 2019/0277314 A1* | 9/2019 | Sawicki | F15B 13/16 |
| 2019/0280580 A1* | 9/2019 | Sawicki | H01F 7/145 |

\* cited by examiner

TORQUE MOTOR WITH DOUBLE FIX SCREWS

This application claims priority to European Patent Application No. 18461511.0 filed Jan. 30, 2018, the entire contents of which is incorporated herein by reference.

BACKGROUND OF THE INVENTION

Servovalves are well known for use in various engineering fields including the field of aircraft actuation systems. They are normally used where both an accurate position control and a quick response are required. A torque motor, which operates the first stage in a servovalve, may provide for the high precision movements of servovalves. Torque motors mostly comprise of coils, an armature (with a mechanical spring), pole pieces and permanent magnets. Whilst these components are responsible for principal of the operation of a torque motor, some other parts (such as bolts) are required to bond them together.

SUMMARY OF THE INVENTION

A torque motor for use in a servovalve is described. The torque motor includes first and second opposing pole pieces with first and second permanent magnets positioned between the first and second pole pieces and an armature comprising a magnetic plate and a flapper. The magnetic plate is positioned between the first and second permanent magnets and the flapper is connected at one end to the magnetic plate. The motor also includes first and second fastening means each extending through the first pole piece, the armature and the second pole piece to thereby fasten the torque motor together.

In any of the examples described herein, the armature may further comprise first and second arms extending perpendicularly away from the magnetic plate, each arm further comprising an ear at an end of the arm that is furthest away from the plate and the first fastening means may extend through a hole provided in the first ear and the second fastening means may extend through a hole provided in the second ear.

In any of the examples described herein, the first and/or second fastening means may comprise a first component and a second component that are connectable to each other.

These first and second components may further comprise a first and a second screw that are connectable to each other.

The first screw of a first fastening means may extend through the first pole piece and the second screw of the same, first fastening means may extend through at least a portion of the armature and through the second pole piece.

In any of the examples described herein, the second screw also extends through a hole provided in the ear of the armature.

In any of the examples described herein, a first end of the second screw of a first fastening means may be threaded for receiving and connecting to an end of the first screw of the first fastening means.

In the same way, a first end of the second screw of a second fastening means may be threaded for receiving and connecting to an end of the first screw of the same, second, fastening means.

The first end of the second screw and the end of the first screw may be positioned between the armature and the first pole piece. That is, the connection between the first and second components, or screws of the fastening component(s) may be provided between the upper side of the ear of the armature and the lower side of the first pole piece.

In any of the examples described herein, the first and/or second fastening means may alternatively comprise a single threaded rod.

In any of the examples described herein the fastening means may be provided so as to extend through the first and second pole pieces at a position where magnetic flux density is a minimum.

In any of the examples described herein, the first pole piece and the second pole piece each comprise first and second holes and the first and second fastening means extend through each of the first and second holes.

In any of the examples described herein, each of the first and second pole pieces comprises only two holes. The fastening means may therefore be provided through only these two holes in each pole piece and a hole in each ear of the armature to fasten the various parts of the torque motor together A method of assembling a torque motor for use in a servovalve is also described. The method comprises providing first and second opposing pole pieces, positioning first and second permanent magnets between the first and second pole pieces; providing an armature comprising a magnetic plate and a flapper, and positioning the magnetic plate between the first and second permanent magnets, with the flapper being connected at one end to the magnetic plate; and the method further comprising fastening the torque motor together by extending a first fastening means through the all of the first pole piece, the armature and the second pole piece and extending a second fastening means through all of the first pole piece, the armature and the second pole piece.

Of course, the torque motor of any of the examples described herein may comprise other features that are known in a torque motor such as coils etc.

In any of the examples provided herein, the armature may further comprise first and second arms extending perpendicularly away from the magnetic plate, each arm further comprising an ear at an end of the arm that is furthest away from the plate, and the step of extending the first and second fastening means through the armature may comprise extending the fastening means through a hole provided in each ear.

In any of the examples provided herein, the first and/or second fastening means may each comprise a first component and a second component that are connectable to each other.

In any of the examples provided herein, the first and second components may comprise first and second screws that are connectable to each other and the method may further comprise: inserting the first screw into a hole in the first pole piece so that the first screw extends through the first pole piece and inserting the second screw through a hole in a portion of the armature so that the second screw extends through at least the portion of the armature and through the second pole piece.

In any of the examples provided herein, a first end of the second screw may be threaded for receiving and connecting to an end of the first screw and the method further comprises screwing the first and second screws together.

In any of the examples described herein the locations of the holes provided in the pole pieces (preferably only two holes in each pole piece) may be selected so as to avoid magnetic flux saturation of the pole pieces after assembly and during operation of the torque motor/servovalve.

A method of assembling a torque motor for use in a servovalve may also comprise placing the lower, or second pole piece on a valve housing. First and second coils may be positioned around the ends of a magnetic plate of an armature, thereby providing an armature assembly. The method may further comprise placing the armature assembly on the bottom, or second, pole piece, and passing the lower, or second components or screws (as described above) through the holes of an ear of the armature, and through holes in the second pole piece, thereby securing both the armature and the second pole piece to the valve housing. The method may further comprise providing the first and second permanent magnets and the first pole piece on the second pole piece. The method may then further comprise passing the upper, or first screw through a hole in the first pole piece, and connecting the first screw to the second screw via a thread of the second screw and a corresponding thread of the first screw, thereby fixing all parts of the torque motor together.

In another example, the method may, of assembling a torque motor for use in a servovalve may comprise placing the lower, or second pole piece on a valve housing. First and second coils may be positioned around the ends of a magnetic plate of an armature, thereby providing an armature assembly. The method may further comprise placing the armature assembly on the bottom pole piece. The method further may further comprise providing first and second permanent magnets and a first pole piece on the second pole piece. The method further comprises passing a first, single, elongated fastening means through all of said first and second pole pieces, and ears of said armature, and passing a second, single, elongated fastening means through all of said first and second pole pieces, and ears of said armature, and securing these fastening means in place via the use of a nut or nuts, thereby securing all pieces of the servovalve to the valve housing.

DETAILED DESCRIPTION OF THE INVENTION

Figure 1:
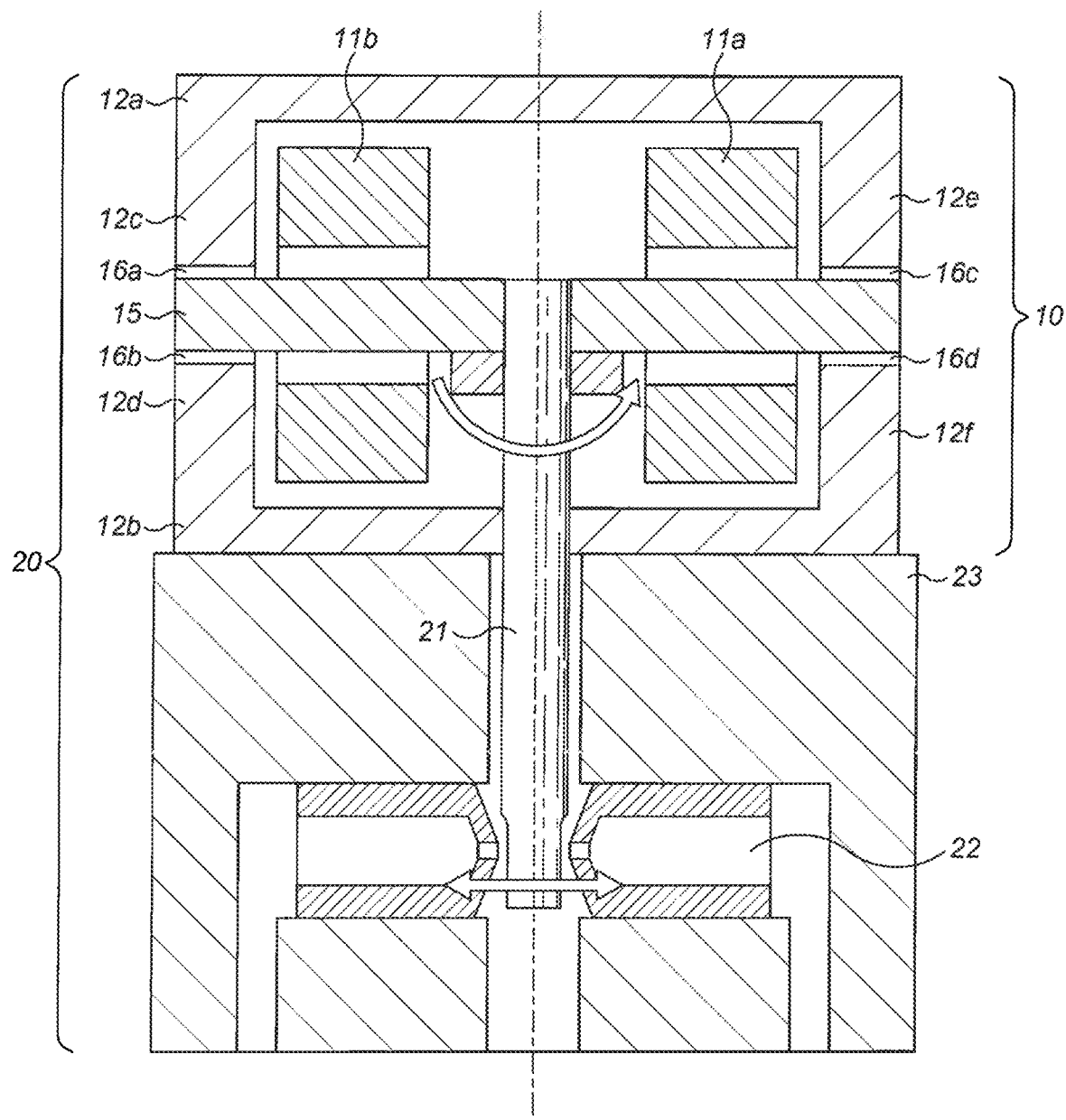
FIG. 1 shows a side cross sectional view of a known flapper nozzle servovalve.

FIG. 1 depicts a side cross sectional view of a known servovalve 20 comprising a torque motor 10 and first and second nozzles 22. As is known in the art, the torque motor 10 comprises first and second magnetic coils 11a, 11b, first and second pole pieces 12a, 12b, and an armature, or spring armature flap assembly (SAFA) 15 located between the first and second pole pieces 12a, 12b. The armature or SAFA 15 comprises a flapper 21, a magnetic plate 15b extending along a first longitudinal axis X, with first and second arms 15c extending away from this plate along a second axis Y which is perpendicular to the first axis Z. At the end of each arm 115c there is an "ear" 15a that is used for fixing the various parts together, as described below. The flapper nozzle servovalve 20 further comprises a valve housing 23 and the flapper 21 is coupled at one end to the magnetic plate 15b with the second, opposite end of the flapper 21 being positioned to be movable between the first and second nozzles 22 as is shown in FIG. 1.

Figure 2A:
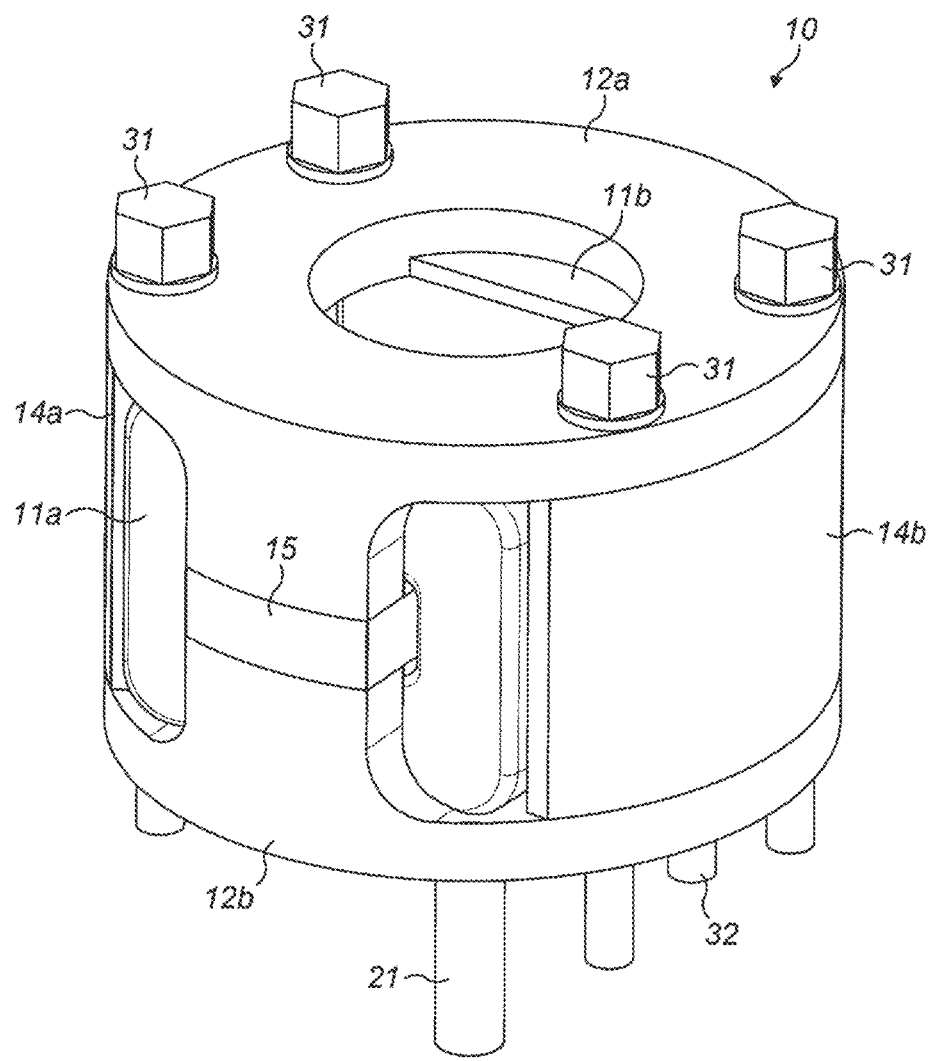
FIG. 2a shows a perspective view of a known servovalve.

First and second pole pieces 12a and 12b each have a "C-shaped" cross section, each with a ring shaped section extending in a first plane that is perpendicular to the plane of the "C-shaped" cross-section (as shown in FIG. 2a) and parallel to the plane in which the magnetic plate 15b lies. Each "C-shaped" cross-section therefore comprises a first portion 12c, 12d, and a second portion 12e, 12f (i.e. the top and bottom of the "C-shape") extending perpendicularly away from the first plane and in the direction of the opposing pole piece 12a, 12b. The first and second portions of each individual pole piece may therefore be described as extending from the ring section of the pole piece in the same direction, as seen in FIG. 1. Upon assembly, the first and second pole pieces 12a, 12b are arranged so that the perpendicularly extending first and second portions 12c, 12d, 12e, 12f face each other. The armature 15 is positioned between the perpendicularly extending portions of the first and second pole pieces 12a, 12b and air gaps 16a-16d are provided between the armature 15 and the first and second portion 12c-12f of each pole piece 12a, 12b.

As mentioned above, the first and second magnetic coils 11a, 11b are provided and these are disposed around the magnetic plate 15b of armature 15. As is known in the art, when a current is applied to the coils 11a, 11b, a magnetic flux acting on the ends of the magnetic plate 15b develops. The magnetic flux will cause the ends of the magnetic plate 15b of the armature 15 to be attracted to the pole pieces 12a, 12b, thereby causing a movement in the armature 15, and therefore the flapper 21.

Figure 2B:
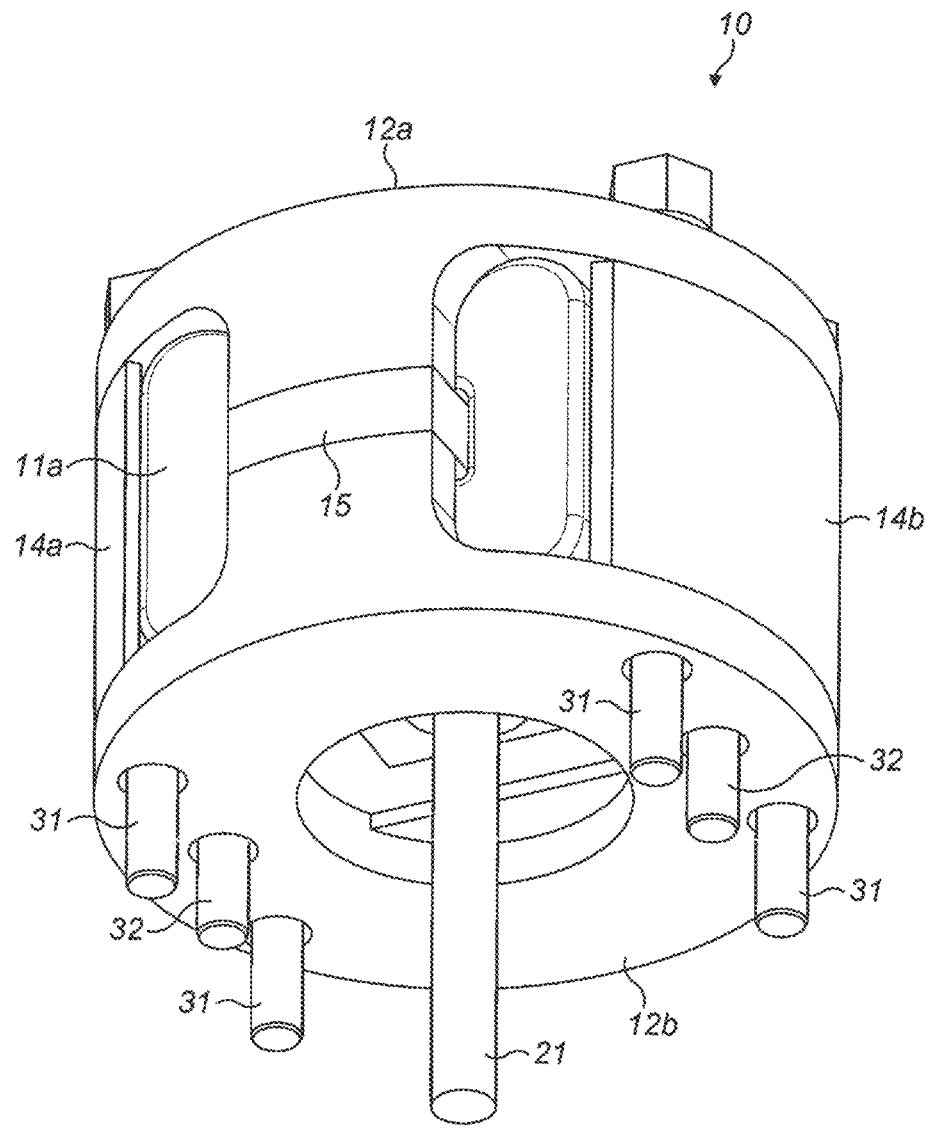
FIG. 2b shows a perspective view of a known servovalve.

FIGS. 2a and 2b depict perspective views of a known torque motor 10 for a servovalve which is assembled and held together with the use of six screws. In detail, four torque motor screws 31 secure the first and second pole pieces 12a, 12b to the first and second permanent magnets 14a, 14b situated there between, and the remaining two armature screws 32 attach the "ears" 15a of the armature 15 to the second pole piece 12b and valve housing (not shown). In other words, four screws extend from and through the first pole piece 12a, from there to and through the first and then second magnet 14a, 14b and from there to the second pole piece 12b. The other two screws extend from an ear 15a of the armature 15 and to the second pole piece 12c. In order to achieve this, the first pole piece 12a must therefore be provided with four holes therethrough, (one for each torque motor screw 31 as is shown in FIG. 2a), and the second pole piece 12b must be provided with six holes, (four for the torque motor screws 31 and two for the armature screws 32 as is shown in FIG. 2b).

Figure 3:
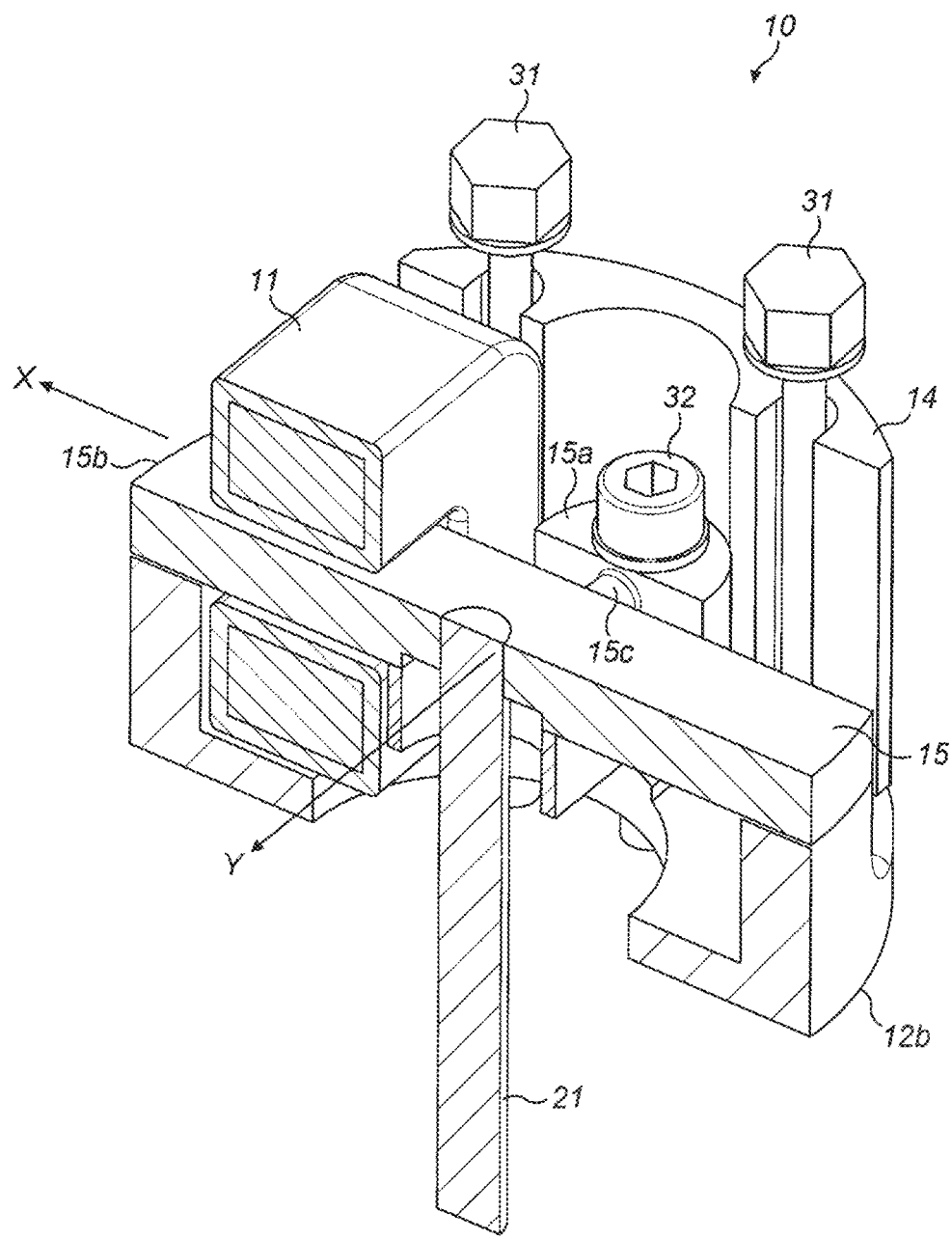
FIG. 3 shows a perspective cut-away view of a known torque motor.

FIG. 3 shows a perspective cut-away view of a known torque motor 10 for a servovalve showing the arrangement of the internal features, the figure depicting the positions of the torque motor screws 31, coil 11, permanent magnet 14, armature 15, one ear 15a of the armature 15, an armature screw 32 and second pole piece 12. As described above, armature 15 is fixed to the rest of the torque motor 10 by armature screw 32 passing through each of the ears 15a and then through the bottom pole piece 12b, and fixing into the valve housing (not shown).

As can be appreciated from FIGS. 2a, 2b and 3 and described above, in known servovalves four holes must currently be provided through the first pole piece 12a so that the torque motor screws 31 may pass therethrough, and six holes through the second pole piece 12b, through which the torque motor screws 31 and armature screws 32 must pass.

Up until now, it has not been recognised that these holes provide disadvantageous effects to the torque motor. For example, the holes for the torque motor screws 31 reduce the cross-section of the pole pieces 12a, 12b, which in turn has been found to cause a saturation of magnetic flux in the vicinity of the holes.

Figure 4:
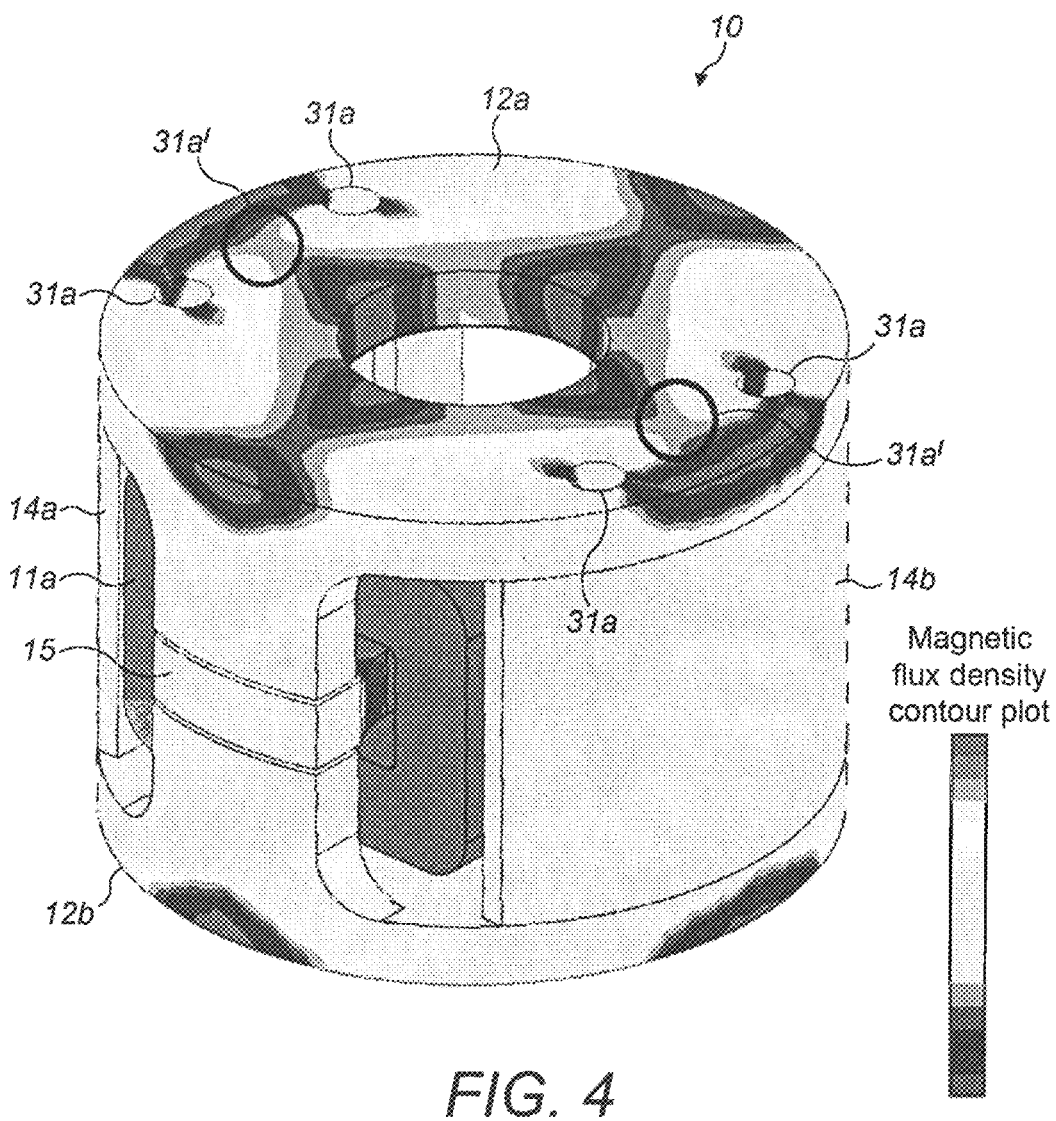
FIG. 4 shows a typical magnetic flux density contour plot in a known torque motor without rotation of the armature.

This effect is shown in in magnetic flux density contour plot of FIG. 4 (showing a known servovalve). As can be seen in this figure, around the torque motor screw holes 31a that extend through first pole piece 12a, it has been found that there exists a saturation of magnetic flux.

It has, however, unexpectedly been found that a local minimum 31a' of magnetic flux density does exist in the pole pieces, as also shown in FIG. 4. Therefore, the new examples described herein have utilized these points 31a' of minimum flux density as, due to being the points of lowest magnetic flux density, they represent an ideal place for screws to be provided through the first pole piece 12a. This is described in greater detail below.

Figure 5:
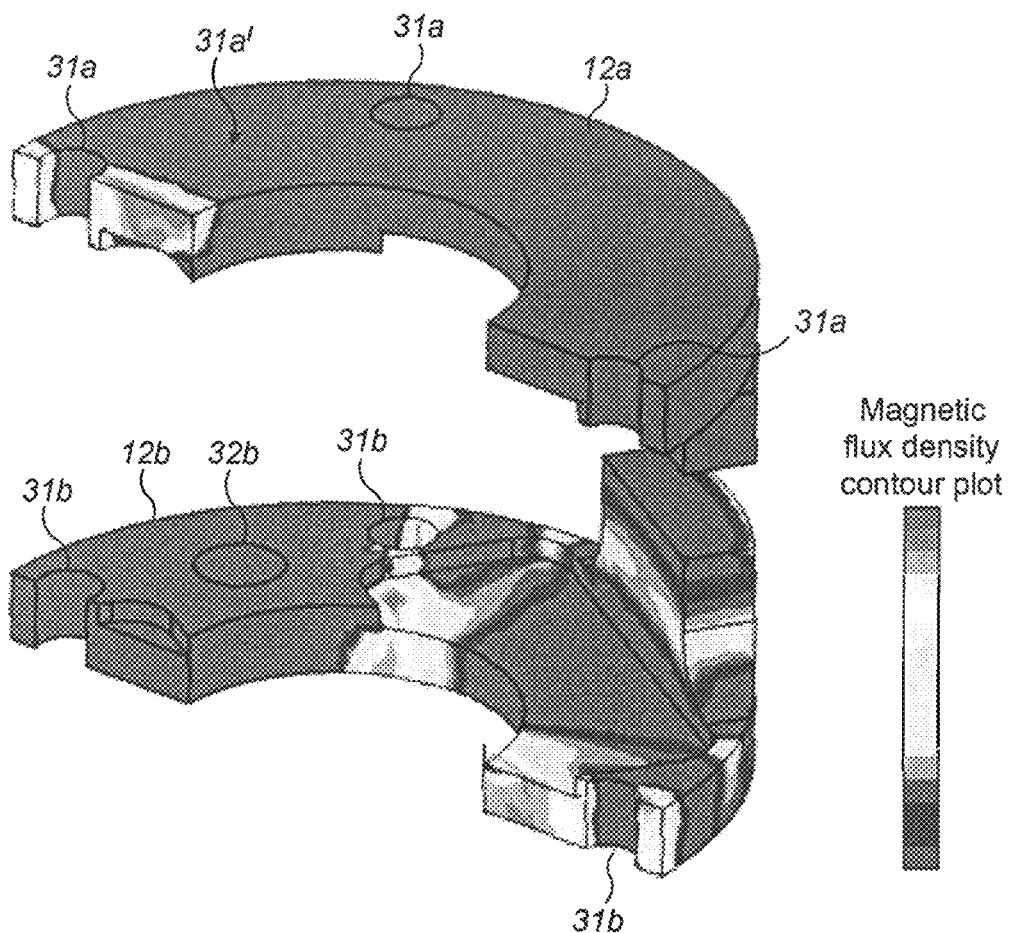
FIG. 5 shows a different scale of results for the contour plot of FIG. 4 hole.

FIG. 5 shows a magnetic flux density contour plot of a cut-away view of first and second pole pieces 12a, 12b of a known type of torque motor that also show these points 31a'. This depicts a different scale of magnetic flux density to that of the known motor in FIG. 4, and further clearly shows that the concentration of magnetic flux density is greatest in the vicinity of the existing torque motor screw holes 31a (provided through the first pole piece 12a), and the existing torque motor screw holes 31b (provided through the second pole piece 12b) for the torque motor screws 31. The magnetic flux density in the vicinity of armature screw hole 32b provided through second pole piece 32b is low.

Figure 6:
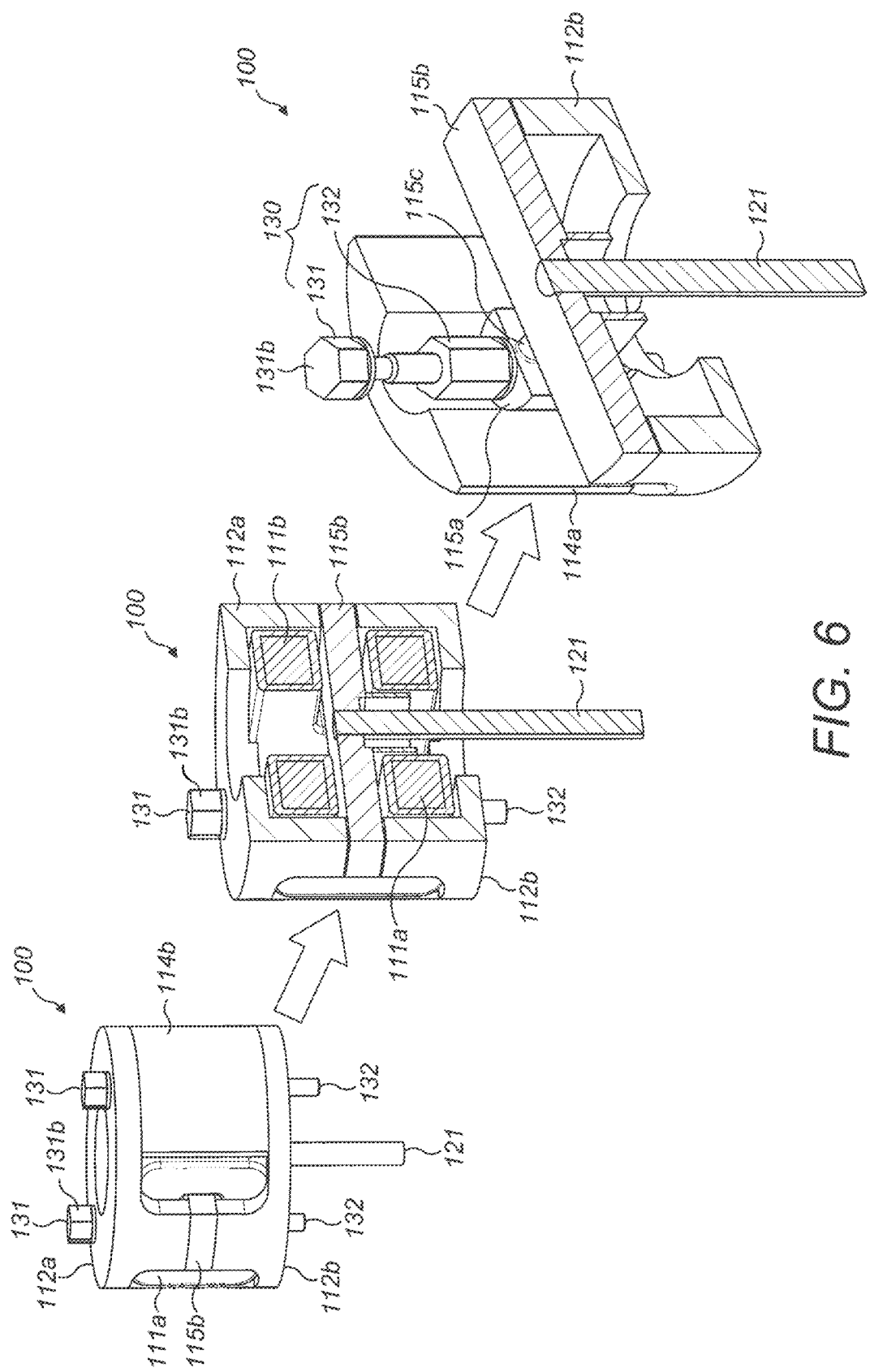
FIG. 6 shows cut-away views of a new torque motor as described herein, depicting its construction.

Various perspective cut-away views of a new, exemplary torque motor 100 for a servovalve are shown in FIG. 6, depicting the internal features of the improved torque motor 100 and servovalve. In a similar manner to the known torque motor described above with reference to FIGS. 1 to 3. The improved torque motor 100 comprises first and second pole pieces 112a, 112b, first and second coils 111a, 111b, first and second permanent magnets 114a, 114b, an armature 115 including a magnetic plate 115b, arms 115c and ears 115a, and a flapper 121. In these new examples, however, torque motor 100 has only two holes provided (see the first image of FIG. 6) in each of the first and the second pole pieces 112a, 112b, and each hole is positioned in the location where magnetic flux density is relatively low, as described above. The different components of the torque motor 100 in these examples are therefore fastened together and held in place relative to each other using only two fastening means 130. In particular, in these cases, a fastening means 130 is provided through each hole to secure all of the first and second pole pieces 12a, 12b, first and second permanent magnets 14a, 14b, and the armature 15 relative to the valve housing.

Figure 7A:
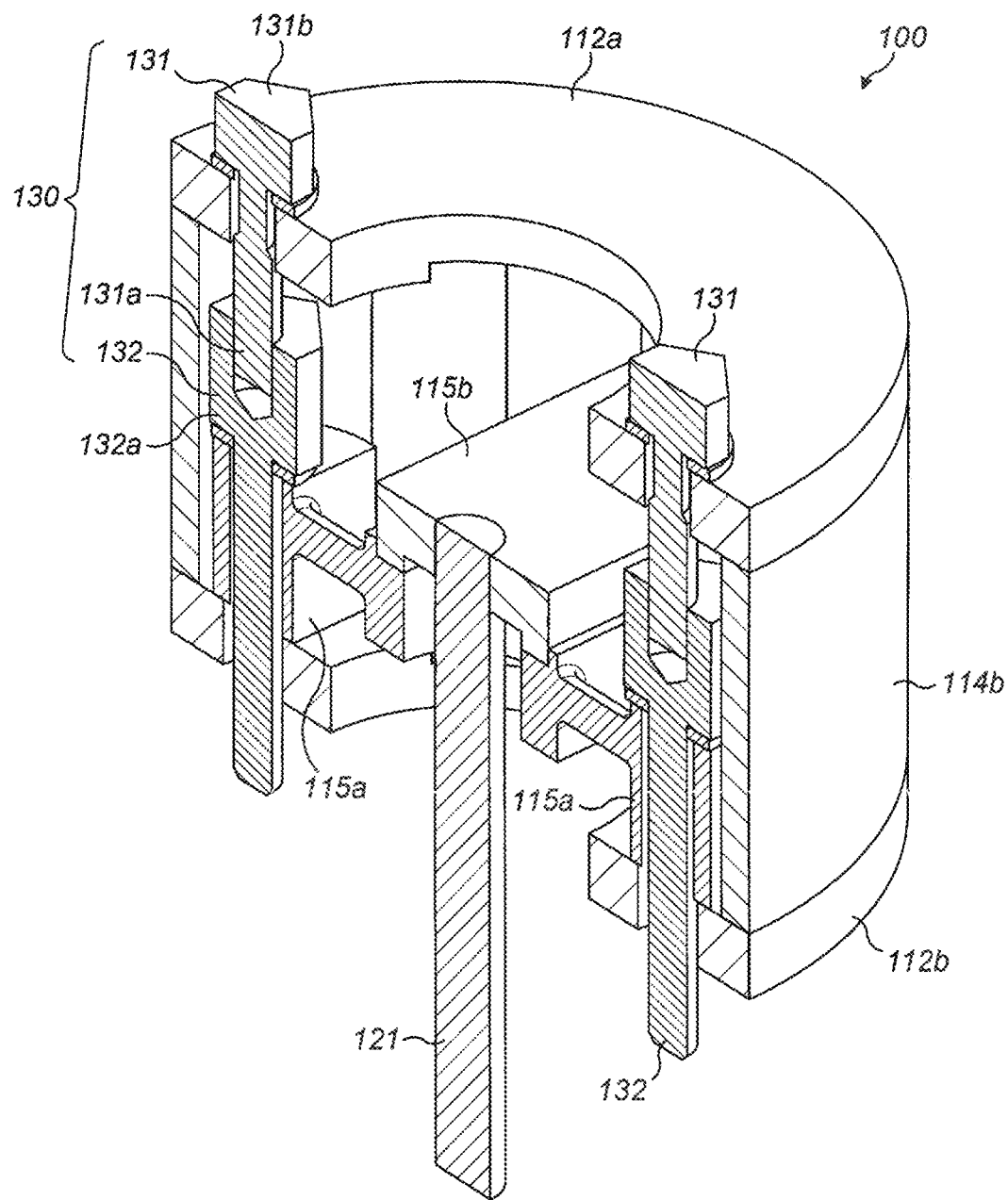
FIG. 7a shows a perspective cross section of a new, exemplary torque motor as described herein.
Figure 7B:
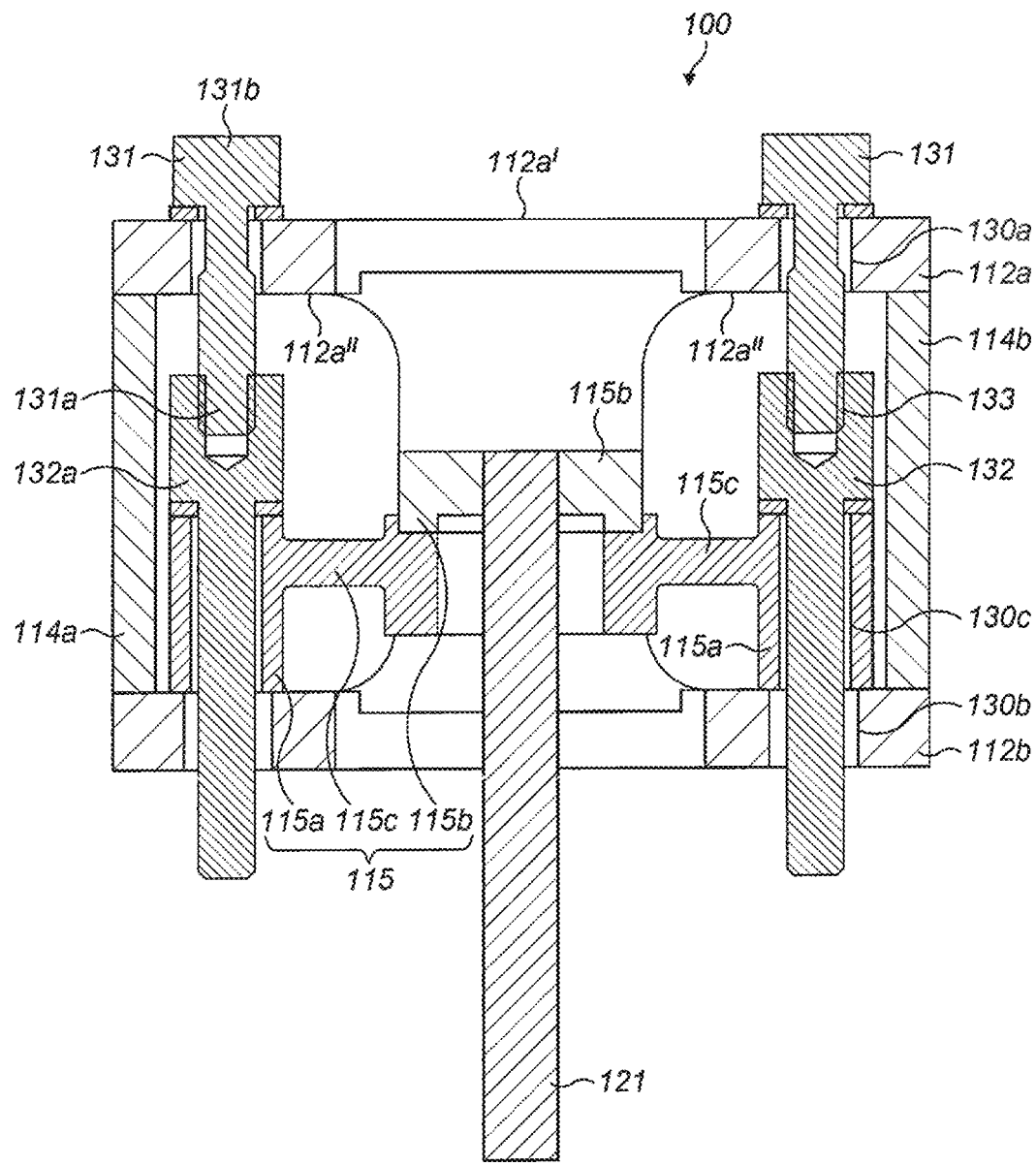
FIG. 7b shows a side cross section of a new, exemplary torque motor as described herein.

FIG. 7a provides a perspective cut-away view and FIG. 7b a side cross sectional view of an exemplary torque motor 100 for a servovalve, providing a more detailed view of the fastening means 130 provided through the first and second pole pieces 112a, 112b, first and second permanent magnets 114a, 114b and the ears 115a of the armature 115.

Therefore, in comparison to known assemblies, wherein the torque motor is held together via six fastening means, the examples described herein do so using only two fastening means 130 that are also more advantageously positioned with regard to magnetic flux.

As seen in FIGS. 7a and 7b, in some examples, each of the fastening means 130 may comprise two connectable components, e.g. a first screw 131 that is able to be connected to a second screw 132. The second screw 132 may pass through hole 132c in the ear 115a of the armature 115 and also through a hole 132b in the second pole piece 112b, thereby securing both to a valve housing (not shown). In this example, a first end 132a, or the head 132a of the second screw 132 is positioned between the armature 115 and the first pole piece 112a and comprises a hollow receiving section with an internal thread 133, into which an end 131a of the first screw 131 may then be screwed, thereby connecting the two components 131, 132 together. As shown in FIGS. 7a and 7b, the first screw 131 passes through a hole 131a provided in the first pole piece 112a, and connects to the second screw 132 via the thread 133 of the second screw 132, thereby fixing the first pole piece 112a in place relative to the second pole piece 112b, and therefore the valve housing (not shown). The head 131b of the first screw is positioned on the outer surface or side 112a' of the first pole piece 112a that is facing away from the torque motor 100 as shown in FIGS. 7a and 7b. The head 132a of the second screw 132, on the other hand, is positioned between the opposite side 112a" of the first pole piece 112, (i.e. the side 112a" facing the armature 115) and the ear 115a of the armature 115. This thereby locks and fastens the components of the torque motor 100 in position relative to each other.

Figure 7C:
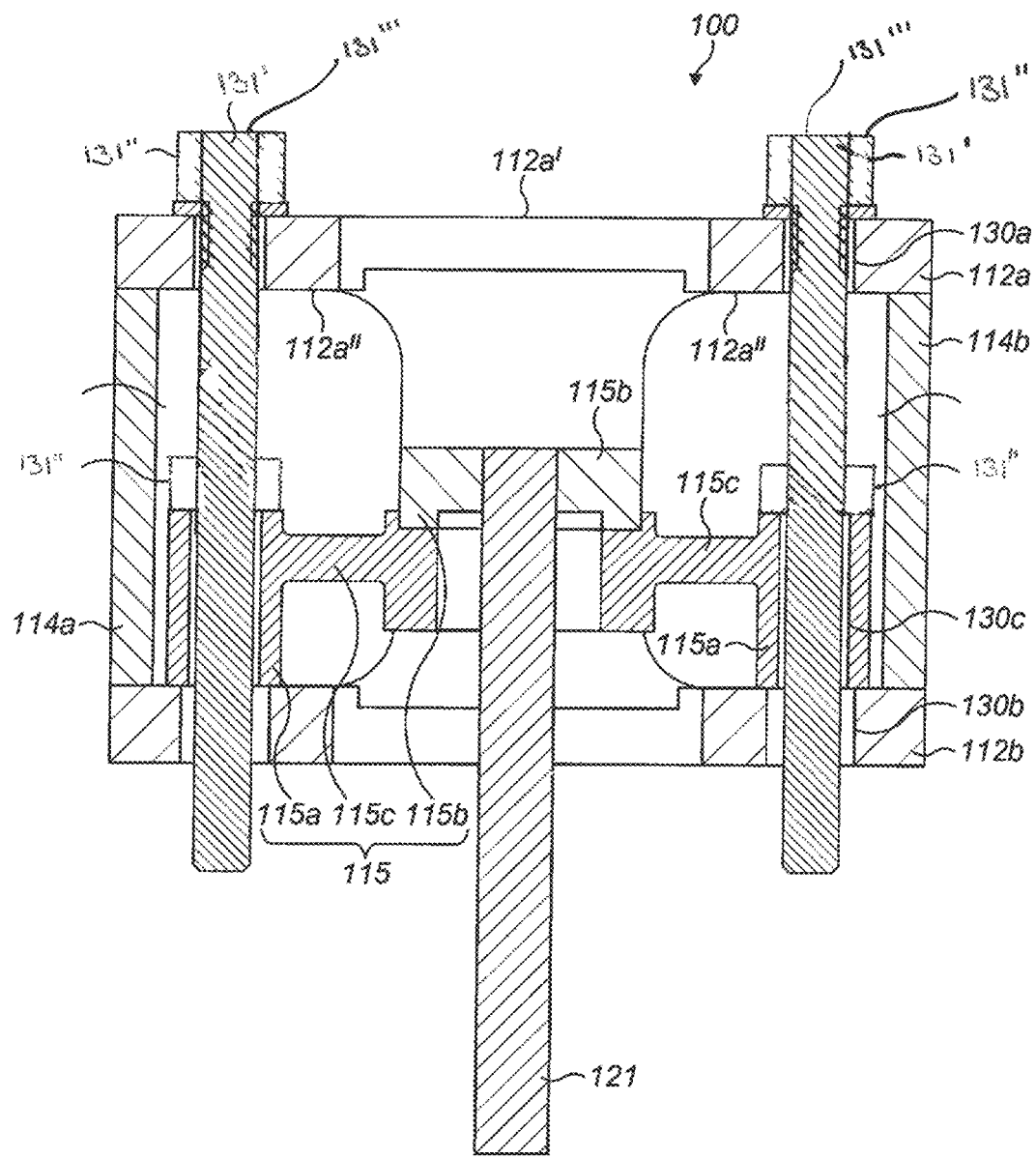
FIG. 7c shows a side cross section of a new, exemplary torque motor as described herein.

Although two screws that are connectable are shown in FIGS. 7a and 7b, the examples described herein are not limited to this and other types of fastening means 130 are also envisaged. For example, as seen in FIG. 7c, each fastening means 130 may comprise a single, elongated fastening means, such as a threaded rod 131' that passes through all of the first and second pole pieces 112a, 112b, and the ears of the armature 115, securing all pieces to the valve housing (not shown). In such an example, a nut or nuts 131" may be used in combination with these elongated rods 131', to hold the rod 131' in place after insertion.

Figure 8B:
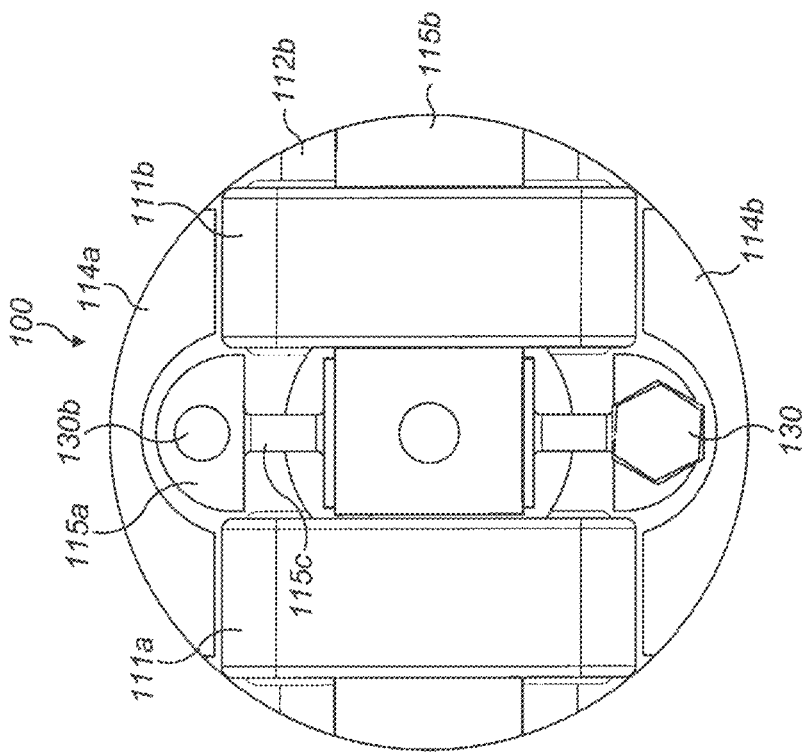
FIG. 8b shows a top view of a new, exemplary torque motor as described herein.
Figure 8A:
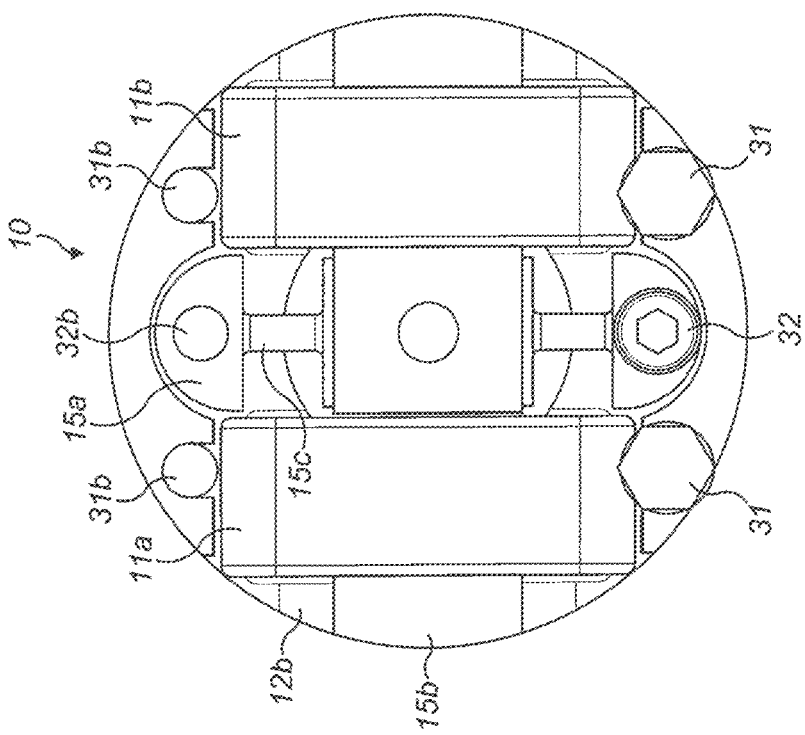
FIG. 8a shows a top view of a known torque motor

For an overall comparison, FIG. 8a shows a top view of a known torque motor 10 for a servovalve, with the first pole piece 12a removed. As can be seen, the torque motor 10 is provided with four torque motor screw holes 31b provided through the second pole piece 12b. As can be appreciated, corresponding torque motor screw holes would be found through the corresponding first pole piece. Further, in a known torque motor 10, two more armature screw holes 32b are provided through second pole piece 12b. These are in line with the holes 32b provided in the ears 115a of the armature 115.

FIG. 8b shows a top view of an exemplary torque motor 100 for a servovalve, with the first pole piece 112a removed. As can be seen, and as described previously, only two holes 130b are now provided through second pole 112b, i.e. the holes 130b that would previously been used only to attach the armature ears 115a to the second pole piece 12b. Similarly, only two holes 130a are now provided through first pole piece 112a. These holes of the exemplary torque motor 100 for a servovalve are provided in an area with relatively low magnetic flux density, thereby preventing saturation of magnetic flux density in either pole piece. The locations of holes 130a and 130b are selected 112a and 112b to avoid magnetic flux saturation of 112a and 112b during operation of 100. The four holes found in known torque motors are, in this example, no longer present.

From this comparison, it can also clearly be seen that the best position (in terms or magnetic flux density) for providing the fastening means is in line with the position at which the armature is fastened to the lower pole piece in the known example of FIG. 8a. Therefore, by extending the fastening means from the ears 115a of the armature 115 to also attach the first pole piece, it is no longer necessary to remove sections of the permanent magnets, or make so many holes in the pole pieces 12a, b. The new examples described herein therefore not only greatly simplify the structure but also result in unexpected advantageous effects.

Some of the ways in which the torque motor may be assembled will now be described in greater detail. For example, via one method, the torque motor may be assembled by firstly placing the second pole piece 112b on the valve housing (not shown). First and second coils 111a, 111b may then be positioned around the ends of the magnetic plate 115b of the armature or SAFA 115, thereby providing an armature assembly. The armature assembly (i.e. consisting of the armature or SAFA with first and second coils placed around the ends of the magnetic plate 115b) may then be placed on the bottom pole piece 112b. The second screws 132 of each of the first and second fastening means may then be passed through each of the hole(s) 132c of the ear 115a of the armature or SAFA 115, and also through each of the two holes 132b in the second pole piece 112b, thereby securing both to the valve housing (not shown). The permanent magnets 114a, 114b and first pole piece 112a may then be arranged on the second pole piece and the first screw 131 of each of the first and second fastening means 130 may then be passed through each of the holes 131a provided in the first pole piece 112a, and connected to the second screw 132 via the internal thread 133 of the second screw 132 and the corresponding external thread of the first screw 131, thereby fixing all parts of the torque motor together.

Alternatively, when the first and second fastening means 130 comprise a single, elongated rod 131', the torque motor may be by firstly placing the second pole piece 112b on the valve housing (not shown). First and second coils 111a, 111b may then be positioned around the ends of the magnetic plate 115b of the armature or SAFA 115, thereby providing an armature assembly. The armature assembly (i.e. consisting of the armature or SAFA with first and second coils placed around the ends of the magnetic plate 115b) may then be placed on the bottom pole piece 112b. The permanent magnets 114a, 114b and first pole piece 112a may then be arranged on the second pole piece. A first single, elongated fastening means such as a threaded rod 131' may then be passed through all of the first and second pole pieces 112a, 112b, and the ears of the armature 115, and a second, single, elongated fastening means such as a threaded rod 131' may also be passed through all of the first and second pole pieces 112a, 112b, and the ears of the armature 115. These rods may then be secured in place using a nut or nuts 131". A nut or nuts 131" may be provided at the end 131''' of the threaded rod 131'. This thereby fastens all pieces of the torque motor together, as well as to the valve housing (not shown). Other methods of assembly are also envisaged. In some methods, the fastening means 130 may comprise a combination of single threaded rods 131' and fastening means 130 comprising first and second components such as screws as described above.

The servovalve of the present invention can therefore result in several benefits over the known servovalves of the prior art. By providing fewer holes through the pole pieces it is possible to provide more consistent magnetic flux density, which in turn provides a more linear stroke-current characteristic, which can allow for more accurate control of the position of the armature of the servovalve. Manufacturing of the servovalve may be easier as the permanent magnets, pole pieces and body require fewer holes, and therefore fewer features to manufacture. Furthermore, the process of assembling the servovalve is easier as there are fewer bolts to screw in. In light of this, the invention can be cheaper to manufacture than known servovalves, as it requires fewer parts, and fewer features to be manufactured.

Although this disclosure has been described in terms of preferred examples, it should be understood that these examples are illustrative only and that the claims are not limited to those examples. Those skilled in the art will be able to make modifications and alternatives in view of the disclosure which are contemplated as falling within the scope of the appended claims.

The invention claimed is:

1. A torque motor for use in a servovalve, the torque motor comprising:
   first and second opposing pole pieces;
   first and second permanent magnets positioned between said first and second pole pieces; an armature comprising:
   a magnetic plate; and
   a flapper, said magnetic plate being positioned between said first and second permanent magnets; and
   further comprising only two fastening means, the only two fastening means being first and second fastening means each extending through said first pole piece, said armature and said second pole piece to thereby fasten said torque motor together.

2. The torque motor of claim 1, wherein said armature further comprises first and second arms extending perpendicularly away from said magnetic plate, each arm further comprising an ear and wherein said first and second fastening means extend through a hole provided in each ear.

3. The torque motor of claim 1, wherein said first and/or second fastening means each comprises a first component and a second component that are connectable to each other.

4. The torque motor of claim 3, wherein said first and second components comprise first and second screws that are connectable to each other.

5. The torque motor of claim 4, wherein said first screw extends through said first pole piece and wherein said second screw extends through at least a portion of the armature and through said second pole piece.

6. The torque motor of claim 3, wherein a first end of said second screw is threaded for receiving and connecting to an end of said first screw.

7. The torque motor of claim 6, wherein said first end of said second screw and said end of said first screw are connected together at a position between said armature and said first pole piece.

8. The torque motor of claim 1, wherein said first and/or second fastening means comprises a single threaded rod.

9. The torque motor of claim 8, further comprising one or more nuts for connecting to an end of said single threaded rod to fasten said rod in place.

10. A method of assembling a torque motor for use in a servovalve, said method comprising:
  providing first and second opposing pole pieces;
  positioning first and second permanent magnets between said first and second pole pieces;
  providing an armature comprising a magnetic plate and a flapper, and positioning said magnetic plate between said first and second permanent magnets, with said flapper being connected at one end to said magnetic plate;
  fastening said torque motor together with only two fastening means by extending a first fastening means through said first pole piece, said armature and said second pole piece; and
  extending a second fastening means through said first pole piece, said armature and said second pole piece.

11. The method of claim 10, wherein said armature further comprises first and second arms extending perpendicularly away from said magnetic plate, each arm further comprising an ear, and wherein said step of extending said first and second fastening means through said armature comprises extending said fastening means through a hole provided in each ear.

12. The method of claim 10, wherein said first and/or second fastening means each comprises a first component and a second component that are connectable to each other.

13. The method of claim 12, wherein said first and second components comprise first and second screws that are connectable to each other and the method further composing:
  inserting said first screw into a hole in said first pole piece so that said first screw extends through said first pole piece; and
  inserting said second screw through a hole in a portion of said armature so that said second screw extends through at least said portion of the armature and through said second pole piece and connecting said first and second screw together.

14. The method of claim 12, wherein a first end of said second screw is threaded for receiving and connecting to an end of said first screw and said method further comprises screwing said first and second screws together.

15. The method of claim 10, wherein said first and/or second fastening means comprises a single threaded rod.

* * * * *